(12) United States Patent
Power (10) Patent No.: US 9,273,438 B2
(45) Date of Patent: Mar. 1, 2016

(54) LEAK SEALANT FOR DAMS AND OTHER STRUCTURES

(76) Inventor: Jefferey Mark Power, Arnprior (CA)

( * ) Notice: Subject to any disclaimer, the term of this patent is extended or adjusted under 35 U.S.C. 154(b) by 996 days.

(21) Appl. No.: 13/428,759

(22) Filed: Mar. 23, 2012

(65) Prior Publication Data

US 2012/0247366 A1    Oct. 4, 2012

Related U.S. Application Data

(60) Provisional application No. 61/470,207, filed on Mar. 31, 2011.

(30) Foreign Application Priority Data

May 2, 2011    (CA) ...................................... 2738941

(51) Int. Cl.
*E02B 3/10*    (2006.01)
*E02B 3/12*    (2006.01)

(52) U.S. Cl.
CPC .. *E02B 3/128* (2013.01); *E02B 3/10* (2013.01)

(58) Field of Classification Search
CPC . F16L 55/1656; F16L 55/1652; F16L 55/164; F16L 55/1645; F16L 55/1653; E02B 3/16; C04B 41/52; B65D 90/046
USPC ................... 405/107, 146, 147, 150.1, 150.2; 252/62
See application file for complete search history.

(56) References Cited

U.S. PATENT DOCUMENTS

| | | | | |
|---|---|---|---|---|
| 2,462,030 A * | 2/1949 | Whitehead | .............. | C04B 28/32 106/688 |
| 2,507,020 A * | 5/1950 | Kullmer | .................... | B44F 9/04 428/142 |
| 3,223,163 A * | 12/1965 | Koch | ..................... | C09K 8/516 106/633 |
| 3,649,574 A * | 3/1972 | Cole | ....................... | C08F 20/54 166/295 |
| 3,650,784 A * | 3/1972 | Albert | ..................... | C04B 20/10 106/400 |
| 3,661,604 A * | 5/1972 | Artmann | ............ | C04B 20/0076 106/721 |
| 3,857,443 A * | 12/1974 | Cole | ....................... | C08F 20/54 166/295 |

(Continued)

OTHER PUBLICATIONS

Comparison of test methods to assess pozzolanic activity, by S. Donatello et al., Cement and Concrete composites 32 (2010), p. 121-127 (see first paragraph for ASTM definition of pozzolanic activity).

(Continued)

*Primary Examiner* — Benjamin Fiorello
*Assistant Examiner* — Edwin Toledo-Duran
(74) *Attorney, Agent, or Firm* — de Wilton Intellectual Property Inc.; Angela C. de Wilton (57) ABSTRACT

An environmentally acceptable leak sealant comprising lava rock aggregate (scoria) for sealing leaks in dams, holding ponds or other water-containing structures. The aggregate is selected and graded for particle size and density. Particles of different sizes cooperate to engage walls of the leak and interlock with each other to form a seal within a leak opening. The particles must sink at a suitable rate, and become entrained in water flow through the leak. Beneficially larger particles have a generally higher sink rate than smaller particles, and so arrive first at the leak to staunch a major part of the flow; intermediate and smaller particles follow to form an effective seal. Applications include sealing sluice gates, stop logs at hydroelectric dams to reduce water wastage for increased electricity productivity, for maintenance requiring de-watering of the turbine; or for sealing leaks in cracks in bedrock or concrete structures associated with dams.

54 Claims, 8 Drawing Sheets

(56) References Cited

U.S. PATENT DOCUMENTS

| | | | | |
|---|---|---|---|---|
| 4,277,355 A | * | 7/1981 | Farcnik | C04B 28/26 106/15.05 |
| 2002/0150429 A1 | * | 10/2002 | Hull | B09C 1/00 405/129.2 |

OTHER PUBLICATIONS

Extract from a textbook entitled: "Eco-Efficient Concrete", A volume in Woodhead Publishing Series in Civil and Structural Engineering; Edited by: F. Pacheco-Torgal, S. Jalali, J. Labrincha and V. M. John, p. 142, s. 7.3, paragraph 1.

* cited by examiner

| Table 1 | Preferred Gradation |
|---|---|
| Sieve Size | Percent Finer |
| 3 in. | 100.0% |
| 2 in. | 89.2% |
| 1 in. | 83.4% |
| 0.75 in. | 76.7% |
| 0.5 in. | 64.6% |
| 0.375 in | 57.4% |
| 0.25 in. | 48.4% |
| #4 | 44.3% |
| #10 | 33.0% |
| #20 | 21.1% |
| #40 | 13.0% |
| #60 | 7.6% |
| #100 | 3.6% |
| #200 | 1.2% |

TABLE OF PARTICLE SIZES FOR GRANULAR MATERIALS

| $\varphi$SCALE | SIZE RANGE | WENTWORTH RANGE | WENTWORTH NAME |
|---|---|---|---|
| -8 to -$\infty$ | 256 -$\infty$ mm | 10.1 -$\infty$ in | boulder |
| -6 to -8 | 64--256 mm | 2.5--10.1 in | cobble |
| -5 to -6 | 32--64 mm | 1.26--2.5 in | pebble |
| -4 to -5 | 16--32 mm | 0.63--1.26 in | pebble |
| -3 to -4 | 8--16 mm | 0.31--0.63 in | pebble |
| -2 to -3 | 4--8 mm | 0.157--0.31 in | pebble |
| -1 to -2 | 2--4 mm | 0.079--0.157 in | granule |
| 0 to -1 | 1--2 mm | 0.039--0.079 in | very coarse sand |
| 1 to 0 | 0.5--1 mm | 0.020--0.039 in | coarse sand |
| 2 to 1 | 0.25--0.5mm | 0.010--0.020 in | medium sand |
| 3 to 2 | 125--250 $\mu$m | 0.0049--0.010 in | fine sand |
| 4 to 3 | 62.5--125 $\mu$m | 0.0025--0.0049 in | very fine sand |
| 5 to 4 | 31.25--62.5 $\mu$m | 0.00015--0.0025 in | silt |
| $\infty$ to 8 | 1/$\infty$ -3.9 $\mu$m | 1/$\infty$ --0.00015 in | clay |
| $\infty$ to 10 | 1/$\infty$ --0.97 $\mu$m | 1/$\infty$ --0.000039 in | colloid |

Source: Wikipedia - Particle size

Figure 10A

PARTICLE SIZE CONVERSION

| SIEVE DESIGNATION | | NOMINAL SIEVE OPENING | | |
|---|---|---|---|---|
| STANDARD | MESH | INCHES | mm | MICRONS |
| 25.4 mm | 1 in. | 1 | 25.4 | 25400 |
| 22.6 mm | 7/8 in. | 0.875 | 22.6 | 22600 |
| 19.0 mm | 3/4 in. | 0.75 | 19 | 19000 |
| 16.0 mm | 5/8 in. | 0.625 | 16 | 16000 |
| 13.5 mm | 0.530 in. | 0.53 | 13.5 | 13500 |
| 12.7 mm | 1/2 in. | 0.5 | 12.7 | 12700 |
| 11.2 mm | 7/16 in. | 0.438 | 11.2 | 11200 |
| 9.51 mm | 3/8 in. | 0.375 | 9.51 | 9510 |
| 8.00 mm | 5/16 in. | 0.312 | 8 | 8000 |
| 6.73 mm | 0.265 in. | 0.265 | 6.73 | 6730 |
| 6.35 mm | 1/4 in. | 0.25 | 6.35 | 6350 |
| 5.66 mm | No. 3 1/2 | 0.223 | 5.66 | 5660 |
| 4.76 mm | No. 4 | 0.187 | 4.76 | 4760 |
| 4.00 mm | No. 5 | 0.157 | 4 | 4000 |
| 3.36 mm | No. 6 | 0.132 | 3.36 | 3360 |
| 2.83 mm | No. 7 | 0.111 | 2.83 | 2830 |
| 2.38 mm | No. 8 | 0.0937 | 2.38 | 2380 |
| 2.00 mm | No. 10 | 0.0787 | 2 | 2000 |
| 1.68 mm | No. 12 | 0.0661 | 1.68 | 1680 |
| 1.41 mm | No. 14 | 0.0555 | 1.41 | 1410 |
| 1.19 mm | No. 16 | 0.0469 | 1.19 | 1190 |
| 1.00 mm | No. 18 | 0.0394 | 1 | 1000 |
| 0.841 mm | No. 20 | 0.0331 | 0.841 | 841 |
| 0.707 mm | No. 25 | 0.0278 | 0.707 | 707 |
| 0.595 mm | No. 30 | 0.0234 | 0.595 | 595 |
| 0.500 mm | No. 35 | 0.0197 | 0.5 | 500 |
| 0.420 mm | No. 40 | 0.0165 | 0.42 | 420 |
| 0.354 mm | No. 45 | 0.0139 | 0.354 | 354 |
| 0.297 mm | No. 50 | 0.0117 | 0.297 | 297 |
| 0.250 mm | No. 60 | 0.0098 | 0.25 | 250 |
| 0.210 mm | No. 70 | 0.0083 | 0.21 | 210 |
| 0.177 mm | No. 80 | 0.007 | 0.177 | 177 |
| 0.149 mm | No. 100 | 0.0059 | 0.149 | 149 |
| 0.125 mm | No. 120 | 0.0049 | 0.125 | 125 |
| 0.105 mm | No. 140 | 0.0041 | 0.105 | 105 |
| 0.088 mm | No. 170 | 0.0035 | 0.088 | 88 |
| 0.074 mm | No. 200 | 0.0029 | 0.074 | 74 |
| 0.063 mm | No. 230 | 0.0025 | 0.063 | 63 |
| 0.053 mm | No. 270 | 0.0021 | 0.053 | 53 |
| 0.044 mm | No. 325 | 0.0017 | 0.044 | 44 |
| 0.037 mm | No. 400 | 0.0015 | 0.037 | 37 |

Smaller sieve "mesh" sizes of 3 1/2 to 400 are designated by the number of openings per linear inch in the sieve.
The following convention is used to characterize particle size by mesh designation:
  - a "+" before the sieve mesh indicates the particles are retained by the sieve;
  - a "-" before the sieve mesh indicates the particles pass through the sieve;
  - typically 90% or more of the particles will lie within the indicated range.
For example, if the particle size of a material is described as -4 +40 mesh, then 90% or more of the material will pass through a 4-mesh sieve (particles smaller than 4.76 mm) and be retained by a 40-mesh sieve (particles larger than 0.420 mm). If a material is described as -40 mesh, then 90% or more of the material will pass through a 40-mesh sieve (particles smaller than 0.420 mm).
Source: This information is provided on page T848 of the a\Aldrich 2003-2004 Catalog/Handbook of Fine Chemicals.

Figure 10B

LEAK SEALANT FOR DAMS AND OTHER STRUCTURES

CROSS-REFERENCE TO RELATED APPLICATION

This application claims priority from U.S. provisional patent application No. 61/470,207 filed 31 Mar. 2011 and Canadian patent application No. 2,738,941 filed 2 May 2011. The entire contents of each of these applications are incorporated herein by reference.

TECHNICAL FIELD

This invention relates to leak sealants and methods for sealing leaks at dams and in other water containing structures, and particularly relates to aggregates used for use at hydroelectric dams for sealing leaks at sluice gates, stoplogs, head gates, wicket gates, for example, or caused by cracks in the concrete structure or bedrock below and around a dam.

BACKGROUND

A significant amount of water is wasted at some hydroelectric dams through leakage of water through poorly sealed sluice gates or stop logs. If diverted through the turbines, this wasted water flow could generate significant additional kilowatts of electricity. Wastage through water leakage is a particular concern during low water seasons or periods of peak power demand.

Many years ago, it was discovered that coal cinders would stop leaks in hydro dams. The stop logs in sluice gates were traditionally made from wood, although steel and other materials may now be used. The process of using coal cinders for stopping leaks was referred to as "cindering". Cinders would simply be dropped into the water of the head pond near the leak, and as the cinders would sink, the cinder particles would be drawn into the leak by the current, and collect to seal the leak. This solution was effective and avoided the need for divers to go down to patch the leak. Coal cinders were abundant and inexpensive. Coal cinders for use as a dam sealant were stripped from abandoned rail beds, from boilers of steam locomotives, or coal ash was purchased from institutions that used coal for fuel, for example.

Leaks may also occur around head gates, wicket gates, cracks in the concrete structure and, on some occasions, the bedrock below and around the dam. Coal cinders are also effective for these applications. In some cases, coal cinders may be used as a temporary fix. They are also important for use as sealants during maintenance operations.

Wicket gates are used to control the amount of water entering the turbine from the penstock. The penstock brings the water down from the head pond through the head gate entrance. Hydroelectric dam operators have a number of different configurations in their powerhouses. In one example, one operator may have 10 units, i.e., generators with their own individual headgates, penstocks, wicket gates, turbine, draft tube and tail race gates. They all do preventative maintenance programs, where they will take one unit out of service to do overhaul from top to bottom. This will include the turbine, which is usually under water rotating at high speed. Preventative maintenance involves a procedure called de-watering the generator or turbine. To do this they must stop the flow of water coming in. Up top, they drop a metal gate called a head gate. This stops the water from flowing into the intake and down the penstock. Since seals are not perfect, these gates always tend to leak around the edges. To de-water the turbine, sealant material is needed to seal leaks around the head gate to stop the water flow completely. Maintenance personnel can safely enter the water turbine area (which is usually submerged when the turbine is running during operation) only after the water flow is stopped. Imagine being down in that dark place in the turbine area, looking up through the wicket gates, up through the penstock and thinking about all that water that could come rushing down if the sealant failed. Thus, maintenance personnel need to have confidence in the reliability of the sealant.

Usually dam operators acquire experience with, and confidence in, the sealant material when doing routine maintenance on the sluice gates and sealing the stop logs. Then, when the time comes to do the critical maintenance involving sealing the head gate for de-watering the turbine, they have confidence in the reliability of the sealant.

To be more effective, a particular mix and specific gravity is required of the aggregate for sealing dams, i.e., the coal cinders are required to have the right gradation, ranging from large pieces down to fine sand sized particles. Depending on what the dam operator is trying to accomplish, a 2" minus mixture or a 1½" minus mixture of cinders, for example, may be optimum. A coarser 3" minus aggregate may be needed if there are larger holes, for example. Specially graded coal cinders for use as leak sealants for dams have been produced by J. M. Power Aggregates Limited.

More recently, concerns have been raised about the heavy metal content of coal cinders and the environmental impact of contaminants in coal cinders. In the 1990s demand for coal cinders for this purpose dropped off. Ontario Hydro, for example, sought to find more environmentally friendly materials. In 1985, in Canada, the Department of Fisheries banned the dumping of coal ash, stones and deleterious substances into water where fish live. Thus, even if the use of coal cinders is still permitted, strict handling procedures are required to ensure coal cinders meet environmental requirements.

Another known alternative to coal cinders for this purpose is an aggregate made from blast furnace slag, marketed under a trade name of Hydro-Lite™, by Lafarge Canada Inc. This material is used just like coal cinders as a leak sealant. However, some dam operators have reported that the slag-based product is not as effective or reliable as coal cinders. They expressed a lack of confidence in it compared with the traditional coal cinders, particularly during critical maintenance involving de-watering the turbine. Also, the composition of blast furnace slag tends to vary significantly from batch to batch, since it is a by-product from smelting ores from different sources. Thus, each batch of slag must be tested and pass leachate tests for potential environmental contaminants.

Conventional heavy aggregates such as crushed stone and gravel have been tested and found to be ineffective or unreliable as leak sealants for this purpose. Polished sand and gravel tend to wash through the leak. In looking at alternative materials, it was also discovered that there has to be a certain amount of abrasive edges on the material to mechanically lock in the holes in the dams. However, if the pieces of material are too large or rough, they may interfere with locking mechanisms of head gates, tail race gates and around the gains of sluice gates. It is also desirable to avoid materials that are damaging to the environment, e.g. have unacceptable levels of contaminants and/or are harmful to aquatic or marine wildlife.

Thus, it would be desirable to find an alternative material or method that avoids or reduces the above-mentioned problems, and preferably one that is environmentally friendly, to replace known solutions such as coal cinders or blast furnace slag based aggregates for use as leak sealants for dams and other water retaining structures.

SUMMARY OF INVENTION

The present invention seeks to eliminate, or at least mitigate, the disadvantages of these known products and methods, or at least provide an alternative.

According to one aspect of the present invention, there is provided a leak sealant comprising: a graded aggregate of lava rock. The lava rock preferably comprises scoria, and may, for example comprise vesicular basalt. The leak sealant preferably has an environmentally acceptable composition.

In preferred embodiments, the sealant provides for sealing a leak in a liquid containing structure, and the leak sealant comprises a graded aggregate of volcanic lava rock comprising particles of different sizes, and wherein particles of the lava rock have a density sufficient to sink in the liquid, and to become entrained in the flow through the leak opening. Preferably the volcanic lava rock is substantially insoluble. The aggregate has a gradation of particle sizes wherein the largest particles are selected based on dimensions of a leak opening to be sealed, so that at least some of the larger particles are sufficiently large to be trapped by or lodge in the leak opening, after which successively smaller particles then become trapped.

The gradation and density of the aggregate may selected dependent on one or more of: the head of liquid above the leak opening, the flow rate through the leak opening, lateral currents in the liquid near the leak opening, and whether the sealant is applied at the liquid surface or a point above or below the liquid surface.

Another aspect of the present invention provides method of staunching flow of liquid through a leak hole in a liquid containing structure, the method comprising the steps of: pouring into the liquid, above and in the vicinity of the leak, an aggregate of lava rock comprising scoria, the aggregate having a gradation of particles of different sizes and having a density sufficient to sink in the liquid and become entrained in liquid flow through the leak hole, and wherein the gradation of the aggregate provides that particles of different sizes become entrapped in the leak hole, by engagement with each other and walls of the leak hole, to form a seal.

Yet another aspect provides a method of staunching flow of liquid through a leak hole in a liquid containing means, the method comprising the steps of: pouring into the liquid, above and in the vicinity of the leak hole, an aggregate of lava rock comprising scoria, the aggregate comprising at least first and second groups of particles, the particles of the first group being generally larger than the particles of the second group and sinking more quickly in the liquid than the particles of the second group, such that particles reaching the leak first are predominantly particles of the first group.

For example, the leak may comprise a flow of water through a leak hole in a water containing structure, such as a dam, stoplogs, sluice gate, stop gate, head gate; other water holding, flow control or water containment structures at a hydroelectric dam; a dyke, and a water control embankment, amongst others. The aggregate may be poured into the water at a surface position that is not directly above the leak so as to compensate for current flow. After pouring an amount of the aggregate, and checking for flow through the leak hole, if the leak hole is not substantially sealed, a second amount aggregate may be poured into the water, for example a second amount of a finer gradation than the first amount.

Leak sealants for sealing water leaks may comprise lava rock aggregates having a density of at least 40 pounds per cubic foot. Lighter aggregates tend to include particles that float and do not sink. Aggregates may have densities up to about 70 pounds per cubic foot.

In one preferred embodiment, a leak sealant is provided comprising an aggregate of volcanic lava rock having a gradation of particle sizes and wherein the aggregate has a density of between 40 and 52 pounds per cubic foot. Preferably the lava rock aggregate has a density of between 44 and 48 pounds per cubic foot, and more preferably has a density of substantially 46 pounds per cubic foot. The aggregate may have a gradation of particle sizes, in a range of 3" minus, 2" minus, 1.5" minus or ¾" minus, for example, depending on the size of the hole or leak and the particular application. Typically, the lava rock aggregate has a gradation of particle sizes in the range from greater than 1" to seal larger holes, together with fines, i.e. finer, sand-like, particles down to #100 or less, to seal smaller gaps between the range of larger particles. For dams having relatively new equipment, and hence smaller holes, a maximum particle size of ¾" may be sufficient. Preferably the aggregate comprises 70% fines of ⅜" and less, down to a fine sand, and 30% larger particles.

In another preferred embodiment the aggregate has a density of substantially 60 lb per cubic foot.

Preferably the lava rock aggregate comprises particles with rough surfaces and/or with sharp or abrasive edges, or a high surface area, so that mechanical locking of the particles assists in sealing the leak. It is therefore desirable that the aggregate is not handled too much after crushing, so as to avoid rounding off or smoothing the edges of the lave rock particles. Polished material is not suitable, as small smooth particles tend to be washed through the leak.

In a preferred embodiment, the aggregate has a gradation substantially as shown in Table 1. However, it will be appreciated that the gradation may be varied somewhat from the preferred aggregate, and for example, an aggregate that is effective for leak sealing may have a similar, but not exactly the same gradation of particles sizes comprising about 70% finer than ⅜" inch, for example.

To meet environmental requirements, the aggregate is selected to have a content of bioavailable contaminants, such as heavy metals, below acceptable toxicity levels. The aggregate preferably leaves a minimal amount of suspended particles in the water after sealing the leak to avoid or reduce harm to aquatic wildlife.

Thus, preferred embodiments for a dam sealant comprise a lava rock aggregate that combines all four of the above mentioned features, i.e.
  a) a density (specific gravity) such that particles sink in water at an appropriate rate, and do not leave suspended solids;
  b) a mixture of an appropriate gradation, e.g. comprising about 70% fines and 30% larger particles, which interlock to provide an effective seal;
  c) particles with rough surfaces, and/or sharp or abrasive edges for improved locking;
  d) a composition that is environmentally friendly, with amounts of potential contaminants that are below acceptable limits or are not bioavailable.

All particles in the aggregate may have substantially the same density (lb per cubic foot) or specific gravity (i.e. density relative to water). Particles of different sizes will then sink at about the same rate, and can-be entrained in the flow and drawn into the hole or gap causing the leak. At first many of the smaller particles will be washed through until the larger particles interlock and partially block the leak, trapping smaller and smaller particles to form a good seal. More beneficially, in grading and mixing the aggregate, lava rock is selected so that particles have a range of specific gravity related to particle size, i.e. so that larger particles have a higher specific gravity and sink more quickly than smaller particles. Thus, the larger particles, with higher specific gravity, sink faster. The larger particles are thus entrained in the flow and drawn into the leak first, where they engage the sides of the hole and interlock. The smaller sized particles with a lower specific gravity, which sink more slowly, then follow to fill gaps between the larger particles. Eventually finer particles, which may have an even lower specific gravity, follow and completely seal the leak. An aggregate that is graded and mixed this way will rapidly seal leaks using very little material.

In preferred embodiments, the aggregate comprises at least first and second groups of particles, wherein particles of the first group are generally larger, have a generally higher density than particles in the second group, and have a generally higher sink rate in water than the sink rate of particles in the second group, so that that particles arriving first at the leak are predominantly those of the first group. For example, the second group may consist of fines, and particles of the first group are more coarsely graded. For example, particles may have a range of sink rates in the order of 1 second per foot, and particles of the first group have a generally higher sink rate than particles of the second group. The second group may have a sink rate of about twice that of the first group, for example. The densities of particles of different sizes vary within a range of plus or minus 1.5 lb per cubic foot, for example, to provide a suitable range of sink rates.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

FIGS. 10A and 10B show, for reference, tables showing standard particle size conversions for metric and imperial units.

DESCRIPTION OF PREFERRED EMBODIMENTS

Figure 1:
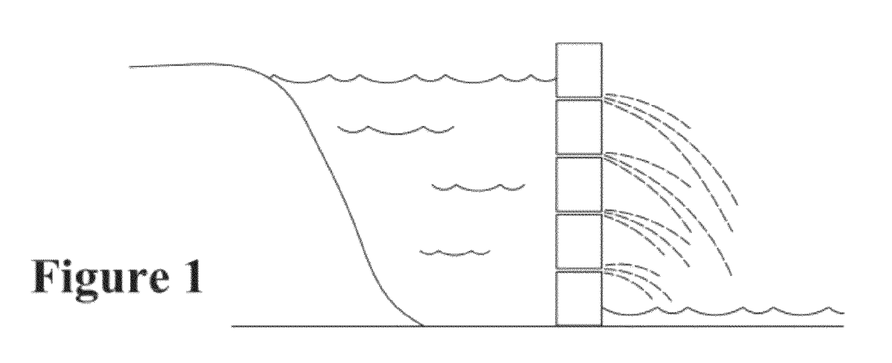
FIG. 1 illustrates schematically a cross-section through a dam comprising stop logs where water leakage is an issue.

As shown schematically in FIG. 1, water leakage may occur between stop logs in a dam, such as a hydroelectric dam, resulting in significant wasted water flow, which would otherwise contribute to generation of electricity.

Figure 2:
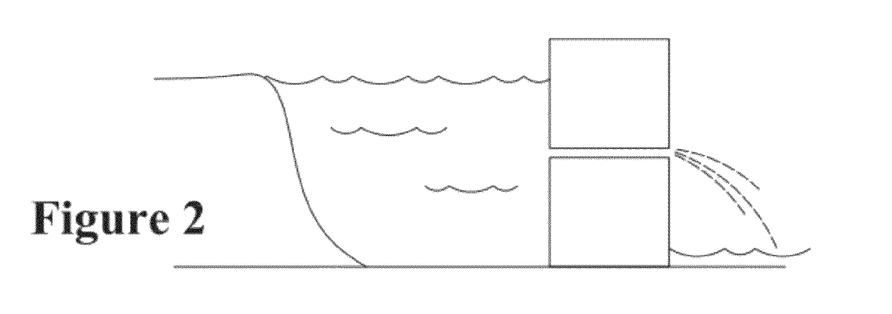
FIGS. 2 to 4 illustrate schematically part of a dam, such as shown in FIG. 1, before and after application of a leak sealant according to a first embodiment of the present invention.
Figure 3:
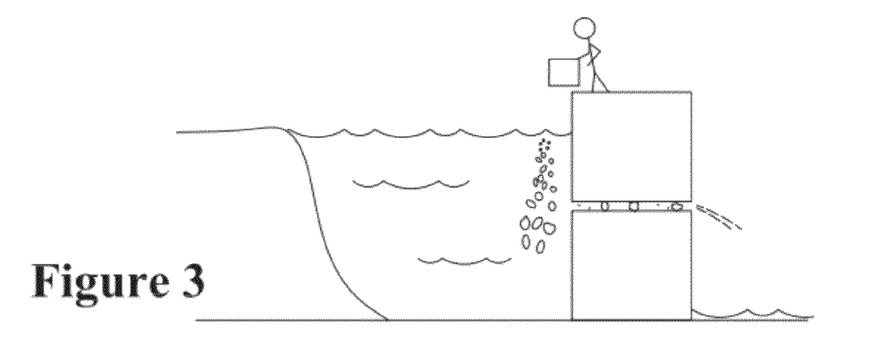
Figure 4:
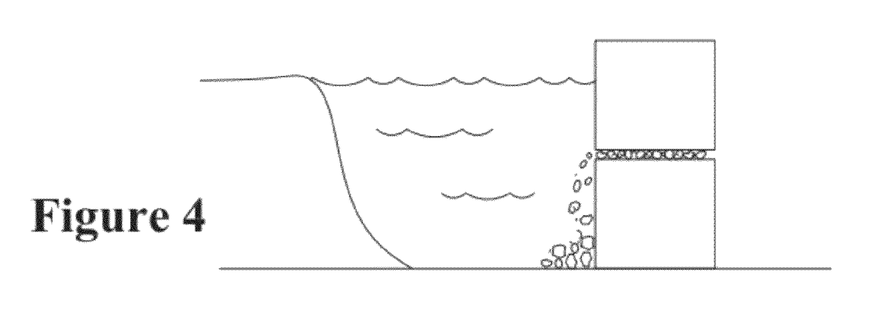

As illustrated schematically in FIGS. 2 to 4, an aggregate may be used to seal such leaks. Aggregate is poured into the water in the dam near the leak. As the particles sink, the particles become entrained in the water flow, and the flow draws or carries the particles of aggregate towards and into the leak. At first small particles are washed through the holes or leaks by the water flow, while larger particles are entrapped or blocked within the hole or gap causing the leak. The larger particles engage sides of the larger holes or gaps and interlock with other particles. Then smaller particles become trapped and interlock with the larger particles filling spaces between them, until the fine particles are also trapped, and eventually the aggregate forms a good seal.

An aggregate for use as a leak sealant, and more particularly for use as a dam sealant according to an embodiment of the present invention comprises a volcanic lava rock, which is provided having a particular density or specific gravity (i.e. density relative to that of pure water) and a particular gradation of particle sizes to provide an effective leak sealant. The aggregate preferably comprises an aggregate of a particular type of lava rock, known as scoria, which has been suitably selected for density and graded to provide a particular gradation of particle sizes, as will now be described. One such product is produced by J M Power Aggregates Ltd, and called "Natural Cinders" (Trademark).

In use, the material may be applied, for example, from a 20 litre pail of the "Natural Cinders" aggregate. The technician stands over the top of where the leak is, and sprinkles the material into the water immediately upstream of the leak. The material sinks very slowly and the current at the leak source pulls the aggregate into the hole. Preferably, the material has rough or abrasive edges, to assist the particles in mechanically locking into the leak, i.e. so that particles engage the walls of the leak and interlock with one another. The larger pieces lock first, then the smaller pieces and the finer pieces. The leak may be stopped in seconds. Not all volcanic lava rock is suitable. The density, i.e. weight per cubic foot of the aggregate is important. If it sinks too fast, the current or water flow at the leak site cannot pull it in. If the material floats, it will not sink or remains suspended. If the material is too dense, it will tend to sink too fast, and simply fall to the bottom and be wasted. The individual particles of the aggregate of different sizes must sink in water at a suitable sink rate. Thus the density of particles in the aggregate is selected to provide an appropriate sink rate, dependent on factors such as the water flow, any lateral currents, and the depth of the leak, i.e. head of water over the leak, for example.

In this context, the term aggregate refers to granular or particulate material made up of particles of different sizes, such as formed by crushing the lava rock. Suitable lava rock may comprise scoria. This type of lava is porous (i.e. vesicular) and may include visible pores (vesicles) and appear to be sponge like, due to volcanic gases trapped during solidification of lava. Extremely porous, low density lava such as pumice, that typically floats in water, is unsuitable. Scoria tends to be somewhat porous, has a rough or abrasive surface, with a high surface area, and has a high strength for its weight. Scoria may comprise e.g. vesicular basalt.

While not wishing to be specifically limited by this definition, according to excerpts from a current Wikipedia entry, scoria is described as follows:

"Scoria is a volcanic rock containing many holes or vesicles. It is most generally dark in color (generally dark brown, black or red), and basaltic or andesitic in composition. Scoria is relatively low in mass as a result of its numerous macroscopic ellipsoidal vesicles, but in contrast to pumice, all scoria has a specific gravity greater than 1, and sinks in water. The holes or vesicles form when gases that were dissolved in the magma come out of solution as it erupts, creating bubbles in the molten rock, some of which are frozen in place as the rock chills and solidifies. Scoria may form as part of a lava flow, typically near its surface, or as fragmental ejecta (lapilli, blocks and bombs), for instance in Strombolian eruptions that form steep-sided scoria cones. Most scoria is composed of glassy fragments, and may contain phenocrysts."

"Scoria differs from pumice, another vesicular volcanic rock, in having larger vesicles and thicker vesicle walls, and hence is denser. The difference is probably the result of lower magma viscosity, allowing rapid volatile diffusion, bubble growth, coalescence, and bursting".

Since lava rock or scoria is a natural product, to provide an effective leak sealant, the material must be selected and graded for particle size and density. In preferred embodiments of the leak sealant, the aggregate of lava rock or scoria has a particular gradation of particle sizes, as will be described below. For sealing a leak in a water containing structure, particles of the aggregate must sink in water and/or be of sufficient density to be entrained in the water flow through the leak.

Tests have shown that an aggregate of lava rock with a density of at least 40 pound per cubic foot is needed. Lighter aggregates tend to have too many particles that float and do not sink in water. For some applications, a lava rock aggregate having a density up to about 70 pounds per cubic foot may be used. The density of individual particles in the aggregate must be sufficient to sink in water, but the bulk density of the aggregate when mixed, may be less, due to air trapped between particles of the aggregate.

For some applications, an aggregate according to embodiments of the present invention, having a density of about 46 or 47 pounds per cubic foot may be optimum. The latter may be selected, for example, if it desired that the "Natural cinders" lava rock aggregate for use as a leak sealant behaves quite similarly to conventional coal cinders. However the lava rock aggregate according to embodiments of the invention does not present the environmental problems with using coal cinders. Dam operators who are familiar with use of coal cinders may therefore more readily adapt to the use a lava rock aggregate of this density, instead of conventional coal cinders as a leak sealant.

Since a certain volume of aggregate is required to seal a leak, if it can be done with less dense material, it is a benefit for shipping and handling, and may reduce freight costs. On the other hand, since the scoria is a natural product, availability of material with different structure, i.e. densities or composition, may vary from mine to mine, necessitating a heavier mix. Moreover, a heavier mix may be useful for some applications.

In one particular embodiment, the aggregate when mixed may be in the range from 40 to 52 pounds per cubic foot, and preferably between 44 and 48 pounds per cubic foot. Most preferably the material has a density of 46 pounds per cubic foot. Lava rock of a suitable type and density appears porous or sponge like with many small holes. It is therefore a relatively lightweight rock. However, none of the pieces in the mixture should float. To be effective, the particles must be dense enough to sink slowly so that they will be drawn into the flow of water through the leak. There should be minimal, if any, suspended solids left after sprinkling the aggregate in the water. (For comparison, the density of pure water at 4° C. is 62.4 pounds per cubic foot).

It is also important that the aggregate has the right gradation of particle sizes. To work most effectively, the aggregate must have a gradation such that some of the larger particles are large enough to be trapped in leak openings, partially blocking the leak, and then successively smaller particles become trapped and fill gaps between larger particles, until a good seal is formed. For example, the aggregate may comprise about 70% fines, that ism smaller particles of e.g. ⅜" and smaller, down to grains that are the size of fine sand, e.g. #100 and #200. About 30% of the aggregate may be larger particles from ½" up to 3". For example, for a leak sealant according to preferred embodiments, the aggregate comprises 70% fines with sizes of ½" or ⅜" down to fine sand, while 30% may be larger particles, e.g. a proportion in each of the ranges from ¾" to 1¼" and from 1¼ to 2". The aggregate may include larger particles, say up to 3", if required, for sealing larger holes or gaps. By way of example, 3" minus aggregate may be required for sealing traditional wooden stoplogs where the gaps between the stoplogs and the gains are larger. On the other hand, steel stoplogs tend to fit more tightly in the gains, and a 1½" minus, or a ¾" minus aggregate may be sufficient.

With experience, the dam operator or technician will select a 3" minus, or smaller, lava rock aggregate depending on the size of the leak to be sealed, and an appropriately sized pail, e.g. 20 litres. Standing on the dam above the leak, and so as to be able to observe water flowing through the leak, the lava rock aggregate is sprinkled from the pail, gradually, into the head pond close to the dam and right above the leak. Initially before the leak is sealed, the flow may be significant, and resemble several high-pressure fire hoses.

As the sealant sinks, and is drawn into the leak by the flow, at first the colour of the water will change from typically frothy white, to take on the colour of the aggregate because, initially, fine particles of the lava rock are washed through by the current. Then, as the larger particles are drawn in by the current, and are caught in the hole and lock, smaller and smaller particles will then also be blocked and lock in. The water flow through the leak will diminish, perhaps breaking into several smaller, lower pressure flows at points along the leak. By observing how the water flow is blocked, the technician can sprinkle more lava rock aggregate at points above the dam where water is still flowing through the leak, until the water is blocked at all points and effectively seals the leak. With some practice, and in calm conditions without wind or lateral current, a technician can effectively and economically target the sealant right above the hole or leak, and block leaks within seconds, using relatively small quantities of sealant.

Figure 7:
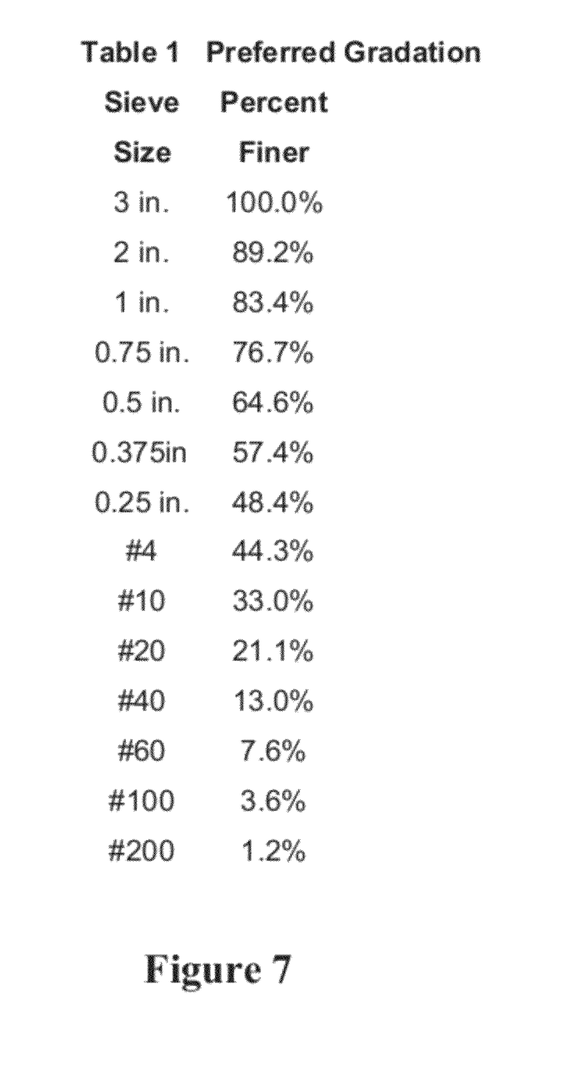
FIG. 7 shows a table of the gradation of a lava rock aggregate according to a preferred embodiment of the invention.
Figure 8:
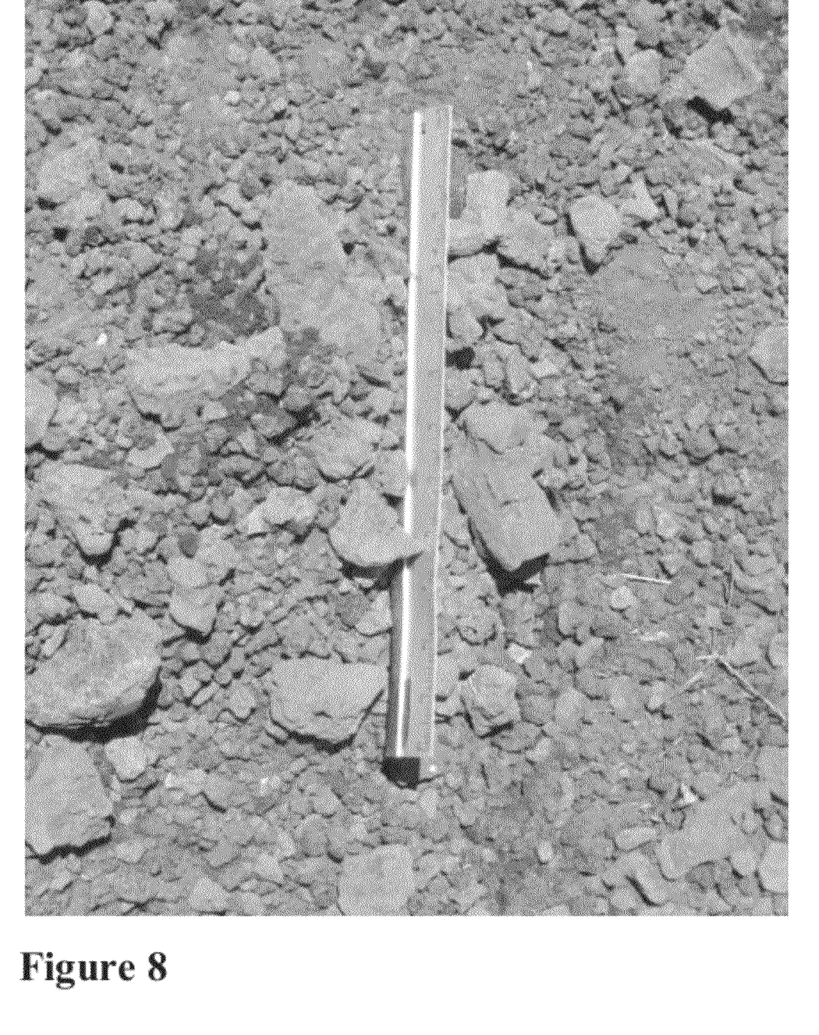
FIG. 8 shows a photo of the leak sealant comprising a lava rock aggregate according to a preferred embodiment.
Figure 9A:
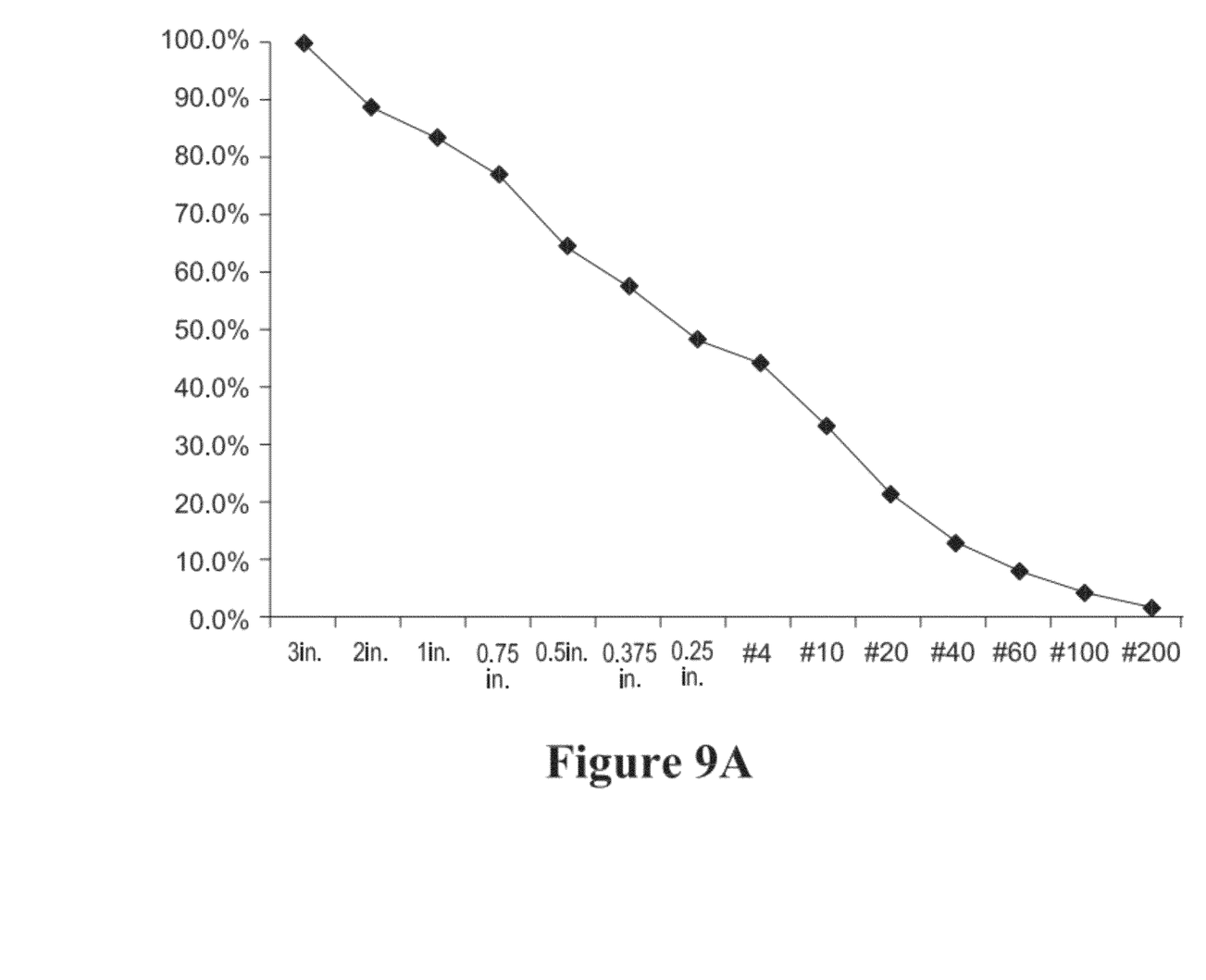
FIGS. 9A and 9B represent the data of FIG. 7 in graphical form.
Figure 9B:
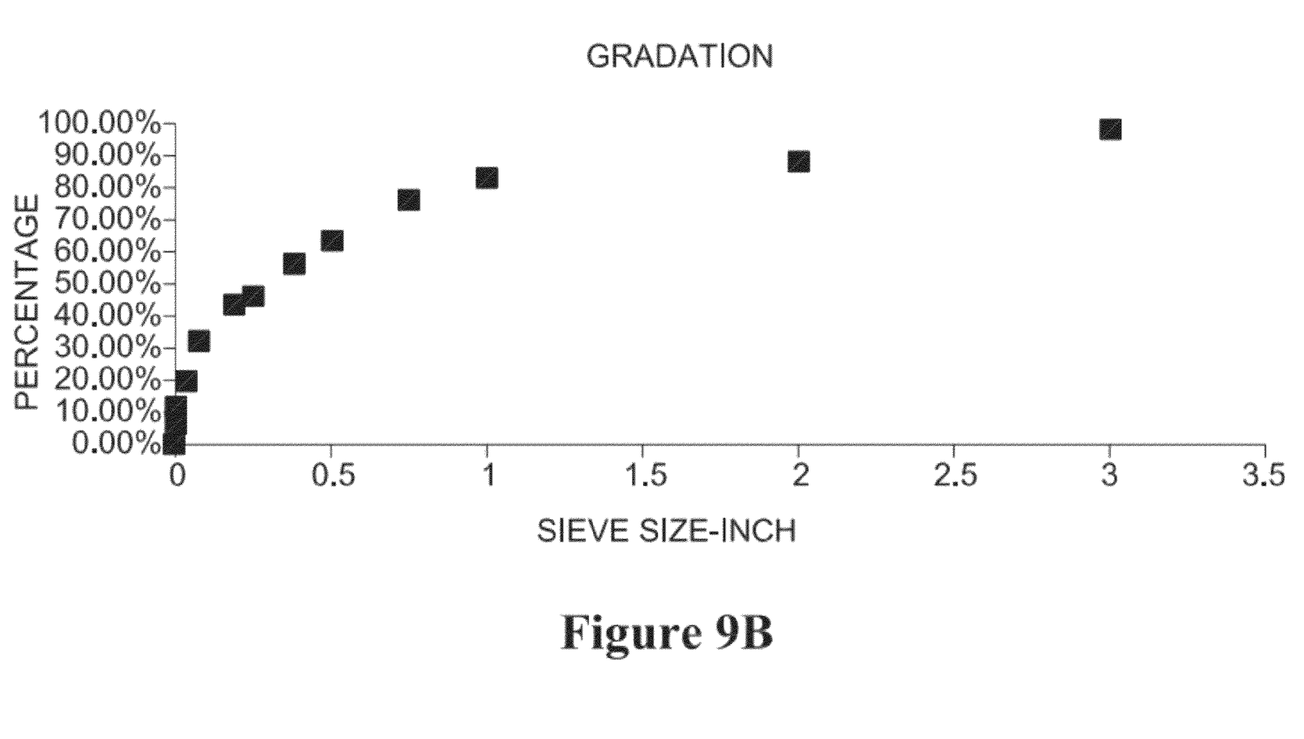
Figure 10A:
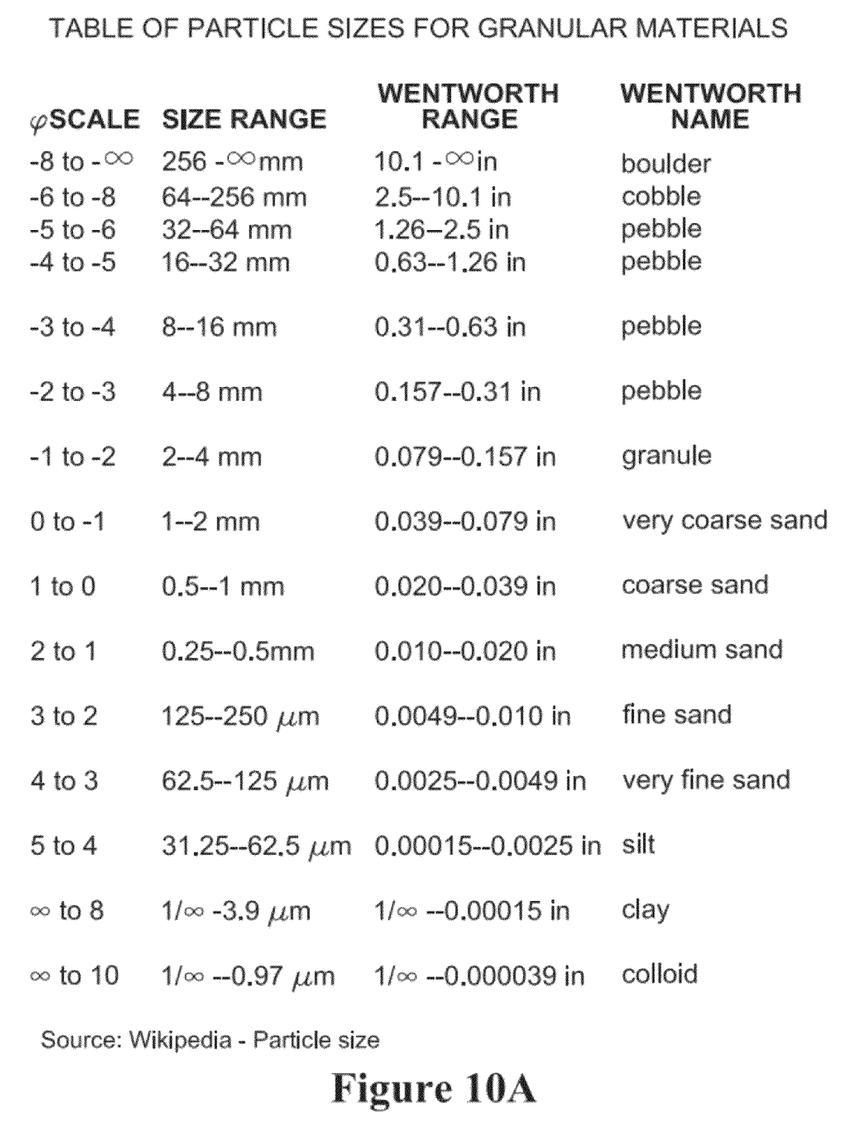

A preferred gradation is listed in Table 1 (shown in FIG. 7) and is also represented on the graphs shown in FIGS. 9A and 9B. Preferred mixtures were obtained from gradation and mixing of naturally occurring volcanic lava rock obtained from New Mexico, and/or Colorado, for example. The mixture may be graded as 3" minus, 2" minus and 1½" minus, depending on the particular application and size of the leak to be sealed. (In this context, 2" minus, for example, means that all particles of the aggregate will pass through a 2" sieve).

It may be necessary to grade and mix lava rock from several different sources to provide an aggregate with the appropriate composition and gradation. During grading and mixing, tests may be made to observe the rate at which particles in each size range sink in water. All particles in the aggregate may have substantially the same density (lb per cubic foot) or specific gravity (i.e. density relative to water). Particles of different sizes will then sink at about the same rate, and will be entrained in the flow and drawn into the hole or gap causing the leak. This will work. However, at first many of the smaller particles will be washed through the leak and wasted, until the larger particles interlock and partially block the leak, and then trap smaller and smaller particles to form a good seal.

Figure 5:
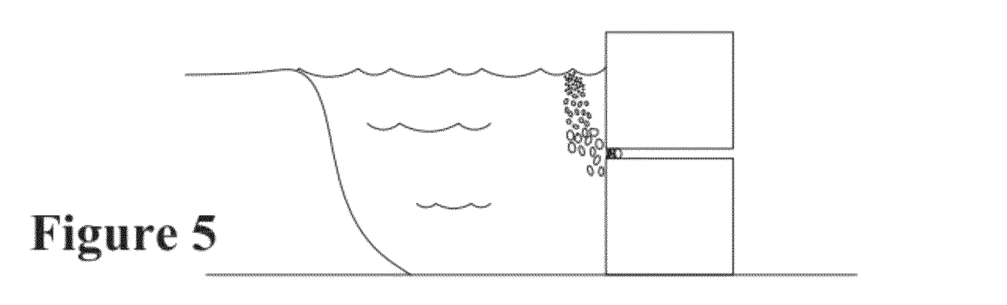
FIG. 5 illustrates schematically sealing of a leak using a leak sealant according to a preferred embodiment.
Figure 6:
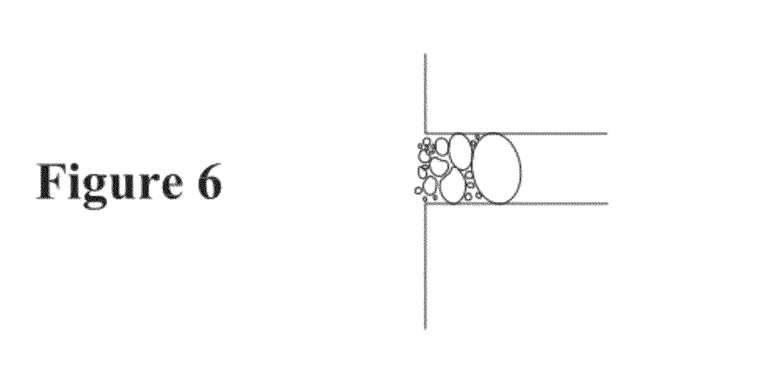
FIG. 6 illustrates schematically an enlarged view of part of FIG. 5.

More beneficially, in grading and mixing the aggregate, lava rock is selected so that particles in the aggregate have a specific gravity related to particle size, i.e. so that larger particles have a higher specific gravity and sink more quickly than smaller particles. Smaller particles may have a lower specific gravity. Thus, the larger particles, with higher specific gravity, sink faster. In that way, the larger particles become entrained in the flow and drawn into the leak first where they engage the sides of the hole and/or interlock with each other (see FIG. 5). Then, smaller sized particles with a lower specific gravity, which sink more slowly, will follow and fill gaps between the larger particles. Eventually finer particles, which may have an even lower specific gravity, will completely seal the leak, as illustrated schematically in FIG. 6. An aggregate that is graded and mixed this way will rapidly seal leaks using less material. The larger pieces do not need much of a difference in specific gravity to sink a little faster than smaller particles. The range for particles of different sizes may fall within plus or minus 1.5 pounds per cubic foot, for example.

Thus, to reduce the amount of leak sealant required, it is preferable that the density, or specific gravity, of the particles increases slightly with increasing particle size so that larger particles sink more quickly are drawn into the leak first. Then successively smaller sized particles sink a bit more slowly. Thus, intermediate sized particles sink are drawn into the leak next, and then the smaller and finer particles. On the other hand, if all particles have the same specific gravity, and sink at about the same rate, when the aggregate is drawn into the leak, particles of different sizes will be carried into the leak, but more of the smaller particles will initially be washed through and wasted, before the larger particles are trapped. A leak sealant according to a second embodiment comprises a lava rock aggregate having a gradation substantially as set out in Table 1, but having a density of substantially 60 lb. per cubic foot. This aggregate had a higher overall average sink rate than the aggregate according to the first embodiment. However, the larger and smaller particles held together in a tighter group as the aggregate sank, and very quickly and effectively sealed a test leak opening. A higher density aggregate may be beneficial, e.g. in conditions where there is a significant lateral current, e.g. in a head pond above stop logs. During application, the operator selects an appropriate point above the leak to sprinkle or dispense the aggregate into the water, taking into account depth and flow through the leak, and considering that lateral current above the leak may carry the sealant sideways, necessitating that the aggregate is applied laterally of the leak to compensate accordingly. Since a denser aggregate has a higher sink rate, this may be helpful in targeting the leak when there is a lateral current, and/or for leaks at a larger depth.

If a first application of the aggregate does not seal the leak completely, a smaller additional amount of the mixed aggregate, or perhaps an additional amount of fines only, may be applied until the leak is effectively sealed.

Tests were carried out successfully using aggregates according to embodiments of the invention for sealing stop logs and sluice gates at hydro dams. Typically water containing structures comprising stop logs may typically be from 16 to 20 ft. high at smaller dams, or perhaps as high as 24 to 30 ft at larger dams. The sink rate of the aggregate may, for example, be approximately 1 second per foot on average, so that the aggregate may take from a few seconds to about 30 seconds to sink and reach the leak. Preferably the sink rates of larger particles e.g. a group of more coarsely graded particles, is generally higher than the sink rate of a group of intermediate sized and/or more finely graded particles, so that the larger particles arrive first at the leak hole and partially seal the leak or stop a major part of the leak. The larger particles are followed by intermediate particles and then smaller particles to substantially seal the leak. Thus, a single application of aggregate can potentially staunch a leak in seconds, using a relatively small amount of material.

Sink Rate—Test Results

To quantify suitable sink rates, smaller scale tests were carried out under more controlled conditions in a test tank 22 inches×24 inches×8 feet high, holding a 6 ft. 6 in. head of water. A slot was made in the tank, to represent a typical gap between stoplogs. The slot leak was 2¾" wide and ¼" high in the side of the tank, 3" above the bottom of the tank. The slot was plugged with a wedge, while the tank was filled. The tank was filled with well water at a temperature of 8 Celsius. Simultaneously, as the wedge was knocked out, a 1 liter volume, or approx. 2 lb, of the lava rock aggregate was released directly over the slot, at the water surface, i.e. 6 foot 3 inches above the slot.

Results were compared for lava rock aggregates of Sample A. 46 lb per cubic foot and Sample B. 60 lb. per cubic foot.

Sample A sealed the leak 90% in a single release. A second release of a small amount of aggregate, or a small amount of fines from the mixed aggregate, sealed the leak 100%.

Sample B sealed the leak 100% in a single release. Both materials had the same gradation, comprising substantially 70% fines, having particle sizes in the range from ⅜" to fine sand, and substantially 30% larger particles (20% ¾" and 10% 2¾").

In other tests, sink rates of the particles of different gradations or sizes were observed over a 6 foot drop.

TABLE II

| Particle size (gradation) | Sample A<br>46 lb per cu. ft. | Sample B<br>60 lb. per cu. Ft. |
| --- | --- | --- |
| 1½" | 5.0 sec per 6 ft. | 3.35 sec per 6 feet |
| ¾" | 7.25 sec per 6 ft. | 4.2 sec per 6 feet |
| ⅜" | 10 sec per 6 ft | 5.4 sec per 6 feet |

Notably, when the particles are graded and mixed, in preferred aggregates, the larger pieces are selected to have a generally higher sink rate so that they tend to reach the leak hole first, followed by smaller particles.

Sink rate may be affected not only by the density or specific gravity, but, for example, by the shape and form of the particles, which affect drag. When particles are rough and porous, they may trap air bubbles, which may be released as they sink, changing their buoyancy. Thus a group of particles of similar sizes may exhibit a range of sink rates.

During tests, because of the irregular shapes of the particles, the particles did not fall uniformly over the 6 foot drop. For example, some particles appeared to reach terminal velocity over about 2' 6", then drifted sideways, decelerating, as in a falling leaf effect, and then accelerated down again, as they became drawn into the water flow through the leak.

Notably, when the particles are graded and mixed, in preferred aggregates, the larger pieces are selected to have a higher sink rate and reach the leak hole first, followed by smaller particles. This mixture more effectively seals the leak in one release. The denser aggregate of 60 lb per cu ft. sank faster, but particles of larger and smaller sizes tended to stay in a tighter group as they sank. The 46 lb. per cu ft. aggregate spread out more as the aggregate particles sank. That is, the particles had a larger spread of sink rates.

Tests indicate that the useful range of density of the aggregate may be in a range from about 40 lb. per cubic foot to about 70 lb. per cubic foot. Heavier aggregates tend to sink too fast and be wasted before they become entrained in the water flow and are carried into the leak. Aggregates less than 40 lb per cubic foot tended to have too many particles that floated and did not sink. Selection of the appropriate gradation and density may depend on factors such as flow rate through the leak, the size of the leak, depth of the leak. Since suitable lava rock, i.e. scoria or lava cinders, is a natural product, density may depend on the source mine. The lava rock may require crushing and grading and mixing to provide a leak sealant with an appropriate density to provide particles of the appropriate sizes and sink rates. The 46 lb. Per cu. Ft. aggregate as described above was more extensively tested and found to be effective and reliable during larger scale testing at hydroelectric dams. However the 60 lb per cu ft. aggregate was also found to be very effective based on small scale testing.

Preferably, the particles should have sufficient strength that they will not collapse or be pulverized by excessive handling, or in use. Volcanic lava rock aggregates with rough or irregular surfaces and sharper edges were found to assist mechanical binding and locking of the aggregate to form a better seal. However, small particles can adversely affect fish gills. It is therefore also desirable that any small suspended particles remaining after application of the aggregate are minimized, to avoid or reduce harm to aquatic wildlife. Aggregates that are polished or rounded by excessive processing or handling do not work well and tend to be washed through the hole or leak. Rough or abrasive particles with sharp edges were found to interlock effectively in the leak and resist wash through. Thus, preferably, after crushing and grading, excessive handling of the aggregate should be avoided so that the particle edges remain sharp and the aggregate retains the abrasive character of freshly crushed lava rock.

It is also important that aggregates meet environmental requirements. The aggregate should not contain contaminants, such as heavy metals, above concentrations that may give rise to environmental concerns. For example, trace amounts of bioavailable contaminants such as silver, cadmium, cobalt, chromium, copper, iron, nickel, lead, zinc, arsenic, mercury, cyanide, ammonia nitrogen, and phosphorus should be at non-hazardous levels. Where higher levels of components, such as Cu and Cr, are found, these should be in an insoluble or non-bioavailable form. Similarly, any radioactive components should be below acceptable or background levels. Preferably the aggregate is substantially non-toxic to fish and other aquatic wildlife and plants. The latter may be assessed, for example, as measured by toxicity testing of soak liquid from the aggregate (i.e. leachate testing) to ensure that levels of known contaminants are substantially non-toxic for species such as trout and daphnia magna, which are representative of aquatic wildlife.

Typically, samples must pass leachate testing to meet local requirements, be otherwise tested and found acceptable to local government or environmental agencies, and/or at least raise no objections to use based on available test information. It is noted, for example, that lava rock and scoria are widely used for applications such as landscaping and in construction materials, where environmentally acceptable products are desirable. Leak sealants comprising a lava rock aggregate, according to embodiments of the invention as described above, provide a more environmentally acceptable alternative to traditional coal cinders, for applications for sealing leaks at hydroelectric dams where coal cinders were traditionally used, i.e., to reduce water wastage during operation or to stop water flow for maintenance that requires de-watering the turbine.

Thus, it will be appreciated that leak sealant comprising lava rock aggregates according to these embodiments, and modifications of these embodiments, may also have potential uses for sealing leaks in other structures, particularly larger scale water retaining structures. One example is a lift lock. Other examples include water control embankments, dykes or levees. The leak sealant may also be used for sealing sheet pile enclosures, such as used to hold back water during construction of bridge piers. That is, sheet piles are used to form enclosures in the river, which are de-watered to allow for construction inside. The lava rock leak sealant may be used for sealing cracks in the concrete structure or in the bedrock below and around a dam. It is envisaged that the lava rock aggregate may also be used as a leak sealant for in other water containing structures or water retaining/holding structures such as reservoirs, tailing ponds and the like, where leaks might occur through cracks resulting from damage, or perhaps resulting from a minor earthquake.

In such applications, the water flow through the leak should be sufficient to entrain particles of the aggregate and draw them into the leak hole to form a seal as described above, and then the hydrostatic pressure of the water above the leak should maintain the seal. Leak sealant aggregates and methods according to embodiments of the present invention may not be suitable for permanently sealing leaks in structures subject to tides, wave motion or backflow, which may tend to draw or push aggregate particles out of the leak hole, although they may be suitable for short term or emergency use.

It will also be appreciated that a leak sealant comprising lava rock or scoria according to alternative embodiments may be useful for other applications such as sealing leaks in other liquid containing structures, i.e. liquids which may be aqueous solution or other liquid in which the lava rock aggregate is substantially insoluble or inert.

INDUSTRIAL APPLICABILITY

Embodiments of the invention described above have application as leak sealants for dams, such as hydroelectric dams. For example, the leak sealant according to embodiments of the invention may be used to seal holes or leaks around seal sluice gates, head gates, wicket gates, cracks in the concrete structure and on some occasions the bedrock below and around the dam. Reliable leak sealants are required during critical maintenance that requires de-watering of the turbine. Since water flow leaks may be quite significant, sealing the leaks may also avoid wastage and contribute to increased electricity production. This may be particularly advantageous in low water season, or during periods of peak demand. Furthermore, since hydroelectricity is considered to be clean energy, an increase in production of hydroelectricity by sealing leaks potentially reduces demand, or supplements demand, from dirtier sources such as coal-fired power stations. Power generation companies therefore have an incentive to utilize this invention, which potentially contributes to "greener" energy and increased carbon credits.

The leak sealant also has other potential applications for sealing leaks in other water or liquid containing structures as mentioned above.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A leak sealant consisting of a granular material for sealing a leak in a liquid containing structure, the granular material consisting of:
  a graded aggregate of lava rock having a gradation of particles of different particle sizes;
  the particles having densities sufficient to sink slowly in water at sink rates of around one second per foot;
  the gradation of particles comprising a mix of fines and coarser particles, fines comprising particle sizes in a range from ⅜ inch to fine sand, and coarser particles comprising generally larger particle sizes and a maximum particle size in a range from ¾ inch to several inches,
  whereby particles become entrained in liquid flow through the leak and the fines and coarser particles mechanically interlock to form a seal.

2. The leak sealant according to claim 1, wherein the lava rock comprises scoria.

3. The leak sealant according to claim 2, wherein the lava rock comprises vesicular basalt.

4. The leak sealant according to claim 1, wherein the aggregate has a density greater than 40 pounds per cubic foot and less than 70 pounds per cubic foot.

5. The leak sealant according to claim 1, wherein the densities of the particles of the aggregate are selected to provide an average sink rate of approximately 1 foot per second.

6. The leak sealant according to claim 1, wherein the lava rock aggregate has a density of between 40 and 52 pounds per cubic foot.

7. The leak sealant according to claim 1, wherein the lava rock aggregate has a density of between 44 and 48 pounds per cubic foot.

8. The leak sealant according to claim 1, wherein the lava rock aggregate has a density of substantially 46 pounds per cubic foot.

9. The leak sealant according to claim 1, wherein the lava rock aggregate has a density of substantially 60 pounds per cubic foot.

10. The leak sealant according to claim 1, wherein the aggregate has a gradation of particle sizes wherein the maximum particle size is selected in a range from ¾ inch to 3 inches, based on dimensions of a leak opening to be sealed.

11. The leak sealant according to claim 10, wherein the aggregate has a gradation of particle sizes wherein as least some of the larger particles are sufficiently large to be trapped or lodge in the leak opening.

12. The leak sealant according to claim 1, wherein the aggregate has a gradation of particle sizes wherein the larger particles are sufficiently large to be trapped or lodge in the leak opening, and smaller particles are sized to become trapped between the larger particles.

13. The leak sealant according to claim 1, wherein the aggregate has a gradation comprising substantially 70% fines, having particles sizes in the range from ⅜" to fine sand, and substantially 30% larger particles.

14. The leak sealant according to claim 1, having a gradation of particle sizes in a range selected from the group consisting of aggregates graded as 3" minus, 2" minus, 1.5" minus and ¾" minus.

15. The leak sealant according to claim 1, having a gradation of particle sizes in the range from greater than 1" to less than #100 mesh.

16. The leak sealant according to claim 1, having a gradation of particles sizes comprising one third finer than #10 mesh and two thirds finer than 0.5 inch.

17. The leak sealant according to claim 1, having a gradation substantially as shown in Table 1.

18. The leak sealant according to claim 1, wherein the gradation of particles comprises at least first and second groups wherein particles of the first group are generally larger than particles of the second group and particles of the first group have a generally higher density and sink rate than particles of the second group.

19. The leak sealant according to claim 18, wherein particles of the second group consist of fines, and particles of the first group are more coarsely graded.

20. The leak sealant according to claim 18, wherein particles of the second group comprise fines having a generally lower sink rate than particles of the first wherein the sink rate of the first group is about one and a half times to two times the sink rate of the second group.

21. The leak sealant according to claim 1, wherein particles of the aggregate comprise particles having a rough surface, and/or abrasive particles and/or particles with sharp edges, and/or particles with a high surface area.

22. The leak sealant according to claim 1, having an environmentally acceptable composition.

23. The leak sealant according to claim 1, wherein the content of bio-available contaminants, such as heavy metals, is below acceptable toxicity levels for aquatic wildlife.

24. The leak sealant according to claim 1, wherein the aggregate comprises particles of different sizes having substantially the same specific gravity.

25. The leak sealant according to claim 1, wherein the aggregate comprises particles having a range of specific gravity related to particle size, the coarser particles having a generally higher specific gravity than the fines, so that larger particles generally sink more quickly than smaller particles.

26. The leak sealant according to claim 25, wherein particles have an average sink rate of approximately 1 second per foot.

27. The leak sealant according to claim 1, wherein the aggregate comprises at least two groups of particles, the first group being more coarsely graded and having a generally higher specific gravity and sink rate, and a second group comprising fines and having a generally lower specific gravity and sink rate, such the that sink rate of the first group is about one and a half times to two times as fast as the second group.

28. The leak sealant according to claim 1, wherein the densities of particles of different sizes vary within a range of plus or minus 1.5 lb per cubic foot.

29. The leak sealant according to claim 1, for sealing a water containing structure comprising one of a dam, stoplogs, a sluice gate, a head gate, and other water holding structures and water containment structures at hydroelectric dams.

30. A leak sealant consisting of a granular material for sealing a leak in a liquid containing structure causing liquid flow through the leak, the granular material consisting of:
  a graded aggregate of lava rock having a gradation of particles of different particle sizes comprising a mix of fines and coarser particles;
  the particles having densilics sufficient to sink in the liquid and become entrained in liquid flow through the leak;
  the gradation of particles comprising at least first and second groups of particles, wherein the particles of the first group are generally larger than the particles of the second group, the second group being fines comprising particles sizes in a range from ⅜ inch to fine sand, whereby particles of the first and second group mechanically interlock to form a seal.

31. The leak sealant according to claim 1 for sealing a leak in a liquid holding or liquid containing structure comprising any one of: a dam, a head pond, a sluice gate, a head gate, stop logs or other dam structure.

32. The leak sealant according to claim 1, for sealing a leak in a liquid holding or liquid containing structure comprising any one of: a concrete structure of a dam, bedrock associated with a dam, a mine tailing pond, reservoir, holding tank, or other water or liquid holding structure.

33. The leak sealant according to claim 27, wherein the first group comprises particles coarser than ¾ inch, the second group comprises fines having particle sizes finer than ⅜ inch, and further comprising an intermediate group of particles comprising particles between ¾ inch and ⅜ inch, generally having a specific gravity intermediate that of the first and second groups, such that particles of the intermediate group generally have a sink rate intermediate that of particles of the first and second groups.

34. The leak sealant according to claim 30, wherein the liquid containing structure comprises any one of: a dam, a head pond, a sluice gate, a head gate, stop logs, other water holding and water containment structures and flow control structures at a hydroelectric dam; a concrete structure of a dam, bedrock associated with a dam, a mine tailing pond, a reservoir, a holding tank, a dyke, a water control embankment and other similar large scale water holding structures.

35. The leak sealant according to claim 30, wherein the gradation and density of the aggregate are selected dependent on one or more of:
the head of liquid above the leak opening,
the flow rate through the leak opening,
lateral currents in the liquid near the leak opening, and
whether the sealant is to be applied at the liquid surface or a point above or below the liquid surface.

36. The leak sealant according to claim 30 for sealing a leak hole of predetermined dimensions, wherein particles of the first group are coarsely graded to a maximum size in a range from ¾ inch to several inches, commensurate with dimensions of the leak, whereby at least some of the particles are of sufficient dimensions to become blocked by or entrapped by sides the leak hole, and particles of the second group are more finely graded for interlocking with the first group of particles, thereby forming a seal in the leak hole.

37. The leak sealant according to claim 30, wherein for sealing leaks in a liquid containing structure, the particles of the aggregate have densities sufficient to sink in the liquid at sink rates of approximately one second per foot.

38. The leak sealant according to claim 30, wherein for sealing leaks in a water containing structure, particles of each group have densities sufficient to sink in water at sink rates of approximately one second per foot.

39. The leak sealant according to claim 30, wherein particles of the first group have a generally higher density than particles in the second group, and have a generally higher sink rate in water than the sink rate of particles in the second group.

40. The leak sealant according to claim 30, wherein the lava rock has an environmentally acceptable composition.

41. The leak sealant according to claim 30, wherein the lava rock comprises scoria, wherein particles are graded such that at least some of the larger particles are of sufficient size to become entrapped by lodging in or engaging sides of the leak opening, and smaller particles are graded to become trapped between larger particles, interlocking therewith, to form a seal in the leak opening.

42. The leak sealant according to claim 30, wherein the liquid is one of water or seawater or river water or a substantially aqueous solution or a substantially aqueous medium, wherein the aggregate has a bulk density in a range between 40 pounds per cubic foot and 70 pounds per cubic foot.

43. The leak sealant according to claim 42, wherein the volcanic lava rock has an environmentally acceptable composition with respect to aquatic wildlife.

44. The leak sealant according to claim 42, wherein the volcanic lava rock is substantially insoluble in the liquid.

45. The leak sealant according to claim 30, wherein for sealing a leak in a structure containing water or a substantially aqueous medium, the aggregate has a density greater than 40 pounds per cubic foot and less than 70 pounds per cubic foot.

46. The leak sealant according to claim 30, wherein the densities of the particles of the aggregate are selected dependent on at least one of the depth of the leak, a required sink rate, and the flow rate of the liquid through the leak.

47. A method of staunching flow of liquid through a leak hole in a liquid containing structure, the method comprising the steps of:
applying by pouring, sprinkling or otherwise releasing into the liquid, above and in the vicinity of the leak, a leak sealant consisting of a granular material,
the granular material consisting of a graded aggregate of lava rock comprising scoria, having a gradation of particles of different sizes comprising a mix of fines and coarser particles, fines comprising particle sizes in a range from ⅜ inch to fine sand, and coarser particles comprising generally larger particle sizes and a maximum particle size in a range from ¾ inch to several inches,
the particles having a density sufficient to sink in the liquid and become entrained in liquid flow through the leak hole, and wherein the gradation of the aggregate provides that particles of different sizes become entrapped in the leak hole and mechanically interlock with each other and walls of the leak hole to form a seal.

48. The method according to claim 47, wherein the mix of fines and coarser particles comprises at least first and second groups of particles, the particles of the first group being generally larger and having a higher specific gravity than the particles of the second group and sinking more quickly in the liquid than the particles of the second group, such that particles reaching the leak first are predominantly particles of the first group.

49. A method of staunching flow of water through a leak hole in a water containing structure, the method comprising the steps of:
applying by pouring, sprinkling or otherwise releasing into the water, above and in the vicinity of the leak, a leak sealant consisting of a granular material,
the granular material consisting of a graded aggregate of lava rock comprising scoria, having a gradation of particles of different sizes, the particles having densities sufficient to sink in water and become entrained in water flow through the leak hole,
the gradation comprising a mix of fines and coarser particles, fines comprising particle sizes in a range from ⅜ inch to fine sand, and coarser particles comprising generally larger particle sizes and a maximum particle size in a range from ¾ inch to several inches, such that particles of different sizes become entrapped in the leak hole and mechanically interlock to form a seal,
the mix of fines and coarser particles comprising at least first and second groups of particles, the particles of the first group being generally larger and having a higher specific gravity than the particles of the second group and sinking more quickly in water than the particles of the second group, such that particles reaching the leak first are predominantly particles of the first group.

50. The method according to claim 49, wherein at least the first group of particles have irregular surfaces such that the particles are entrapped in the leak hole by engagement with each other and walls of the leak hole.

51. The method according to claim 49, wherein the aggregate is applied into the water at a surface position that is not directly above the leak so as to compensate for current flow.

52. The method according to claim 49 comprising:
after applying a first amount of the aggregate, checking for water flow through the leak hole, and if the leak hole is not substantially sealed, applying a second amount of aggregate.

53. The method according to the claim 52, wherein the second amount of aggregate comprises a finer gradation than the first amount.

54. The method according to claim 49 wherein the water containing structure comprises one of a dam, stoplogs, sluice gate, stop gate, head gate; other water holding, flow control or water containment structures at a hydroelectric dam; a dyke, and a water control embankment.

* * * * *